United States Patent
Treat et al.

(10) Patent No.: US 11,652,875 B2
(45) Date of Patent: May 16, 2023

(54) DYNAMIC USER INTEGRATION IN GROUP-BASED COMMUNICATION SYSTEMS

(71) Applicant: Salesforce, Inc., San Francisco, CA (US)

(72) Inventors: Albert Treat, San Francisco, CA (US); Airat Aminev, Vancouver (CA); Alejandro Miguel Cebrian Trevino, Alameda, CA (US); Benjamin Smit, San Francisco, CA (US); Carla Gonzales, San Francisco, CA (US); Shivani Sharma, San Francisco, CA (US); Zindziswa McCormick, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/588,711

(22) Filed: Sep. 30, 2019

(65) Prior Publication Data
US 2021/0099518 A1   Apr. 1, 2021

(51) Int. Cl.
| | | |
|---|---|---|
| G06F 15/163 | (2006.01) | |
| H04L 65/1089 | (2022.01) | |
| H04L 67/306 | (2022.01) | |
| H04L 12/18 | (2006.01) | |
| H04L 67/104 | (2022.01) | |
| H04W 4/08 | (2009.01) | |
| H04L 65/1069 | (2022.01) | |

(52) U.S. Cl.
CPC ...... *H04L 67/1044* (2013.01); *H04L 12/1822* (2013.01); *H04L 65/1069* (2013.01); *H04L 65/1089* (2013.01); *H04L 67/306* (2013.01); *H04W 4/08* (2013.01)

(58) Field of Classification Search
CPC ............ H04L 67/1044; H04L 12/1822; H04L 65/1069; H04L 65/1089; H04L 67/306; H04W 4/08
USPC ........................................................... 709/204
See application file for complete search history.

(56) References Cited

U.S. PATENT DOCUMENTS

| | | | |
|---|---|---|---|
| 2013/0109425 A1* | 5/2013 | Kerger | H04W 4/08 455/518 |
| 2014/0172996 A1* | 6/2014 | Deeter | H04L 51/14 709/206 |
| 2016/0104067 A1* | 4/2016 | Xu | H04L 67/306 706/46 |
| 2016/0134576 A1* | 5/2016 | Ju | G06Q 50/01 709/204 |
| 2017/0127021 A1* | 5/2017 | Frank | G06K 9/6293 |

(Continued)

OTHER PUBLICATIONS

"Die, Email, Die! A Flickr Cofounder Aims to Cut us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Cheikh T Ndiaye
*Assistant Examiner* — Ayele F Woldemariam
(74) *Attorney, Agent, or Firm* — Lee & Hayes, P.C.

(57) ABSTRACT

Embodiments of the present disclosure provide methods, systems, apparatuses, and computer program products that enable performing dynamic user integration in a group-based communication system.

20 Claims, 13 Drawing Sheets

(56) References Cited

U.S. PATENT DOCUMENTS

| | | | |
|---|---|---|---|
| 2018/0007150 A1* | 1/2018 | Deopura | H04W 4/23 |
| 2018/0198831 A1* | 7/2018 | Calcaterra | H04L 63/102 |
| 2018/0287982 A1 | 10/2018 | Draeger et al. | |
| 2019/0280993 A1* | 9/2019 | Queva | G06F 3/011 |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

DYNAMIC USER INTEGRATION IN GROUP-BASED COMMUNICATION SYSTEMS

BACKGROUND

User integration is central to operational effectiveness of various software applications, such as various complex software applications. Applicant has identified a number of deficiencies and problems associated with user integration in complex software applications. Through applied effort, ingenuity, and innovation, many of these identified problems have been solved by developing solutions that are included in embodiments of the present disclosure, many examples of which are described in detail herein.

BRIEF SUMMARY

Embodiments disclosed herein are directed to performing dynamic user integration in a group-based communication system. The group-based communication system includes a group-based communication server, a group-based communication repository, and a plurality of group-based communication channels.

According to some aspects of the present disclosure, an apparatus for performing dynamic user integration in a group-based communication system is disclosed. The disclosed apparatus comprises at least one processor and at least one memory including computer program code. The memory and the computer program code are configured to, with the processor, cause the apparatus to perform operations configured to determine one or more integration functionality metrics associated with a group-based user profile; determine an engagement status for the group-based user profile with respect to each integration functionality metric of the one or more integration functionality metrics; and in response to detecting, based on each engagement status for an integration functionality metric of the one or more integration functionality metrics, one or more under-engaged integration functionality metrics of the one or more integration functionality metrics, determine an integration policy for the group-based user profile, wherein the integration policy is configured to render one or more integration notifications corresponding to the one or more under-engaged integration functionality metrics to the group-based user profile, and render each integration notification of the one or more integration notifications.

In some embodiments, the one or more integration notifications comprise one or more indexed integration notifications configured to be rendered as part of a dynamic user integration portal. In some embodiments, the primary integration portal is transmitted using a prioritized resource allocation status. In some embodiments, rendering a particular integration notification of the one or more integration notifications comprises rendering the particular integration notification in response to detecting a triggering user interaction associated with the corresponding under-engaged integration functionality metric associated for the particular integration notification. In some embodiments, the one or more integration notifications comprises one or more connection recommendations, wherein each connection recommendations of the one or more connection recommendations is associated with a related group-based user profile of one or more related-group-based user profiles associated with the primary group-based user profile.

In some embodiments, the at least one memory and the computer program code are configured to, with the at least one processor, cause the apparatus to detect an integrative user interaction configured to engage with a particular under-engaged integration functionality metric of the one or more under-engaged integration functionality metrics; update the engagement status for the particular under-engaged integration functionality metric based on the integrative user interaction; and update the integration policy based on the updated engagement status for the particular under-engaged integration functionality metric. In some embodiments, determining the one or more integration functionality metrics associated with a group-based user profile comprises: determining a plurality of other group-based user profiles associated with the primary group-based user profile; mapping engagement statuses for each of the plurality of other group-based user profiles with respect to each of a plurality of other candidate integration functionality metrics onto a functionality space; and selecting, from the plurality of candidate integration functionality metrics and based on the functionality space, the one or more integration functionality metrics.

BRIEF DESCRIPTION OF THE DRAWINGS

Figure 1:
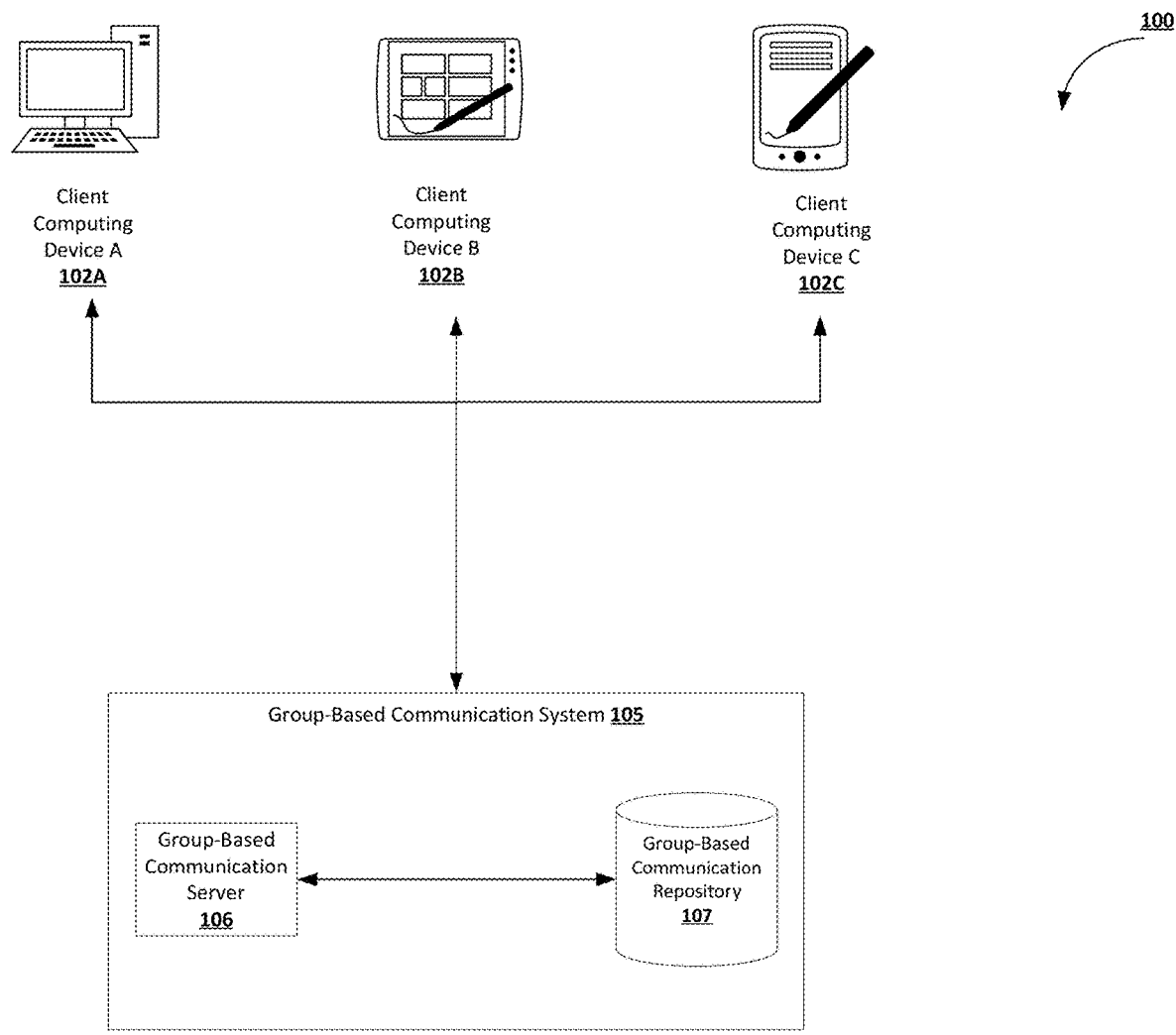

Having thus described the disclosure in general terms, reference will now be made to the accompanying drawings, which are not necessarily drawn to scale, and wherein:

FIG. 1 depicts an example architecture for implementing some embodiments of the present disclosure.

Figure 2:
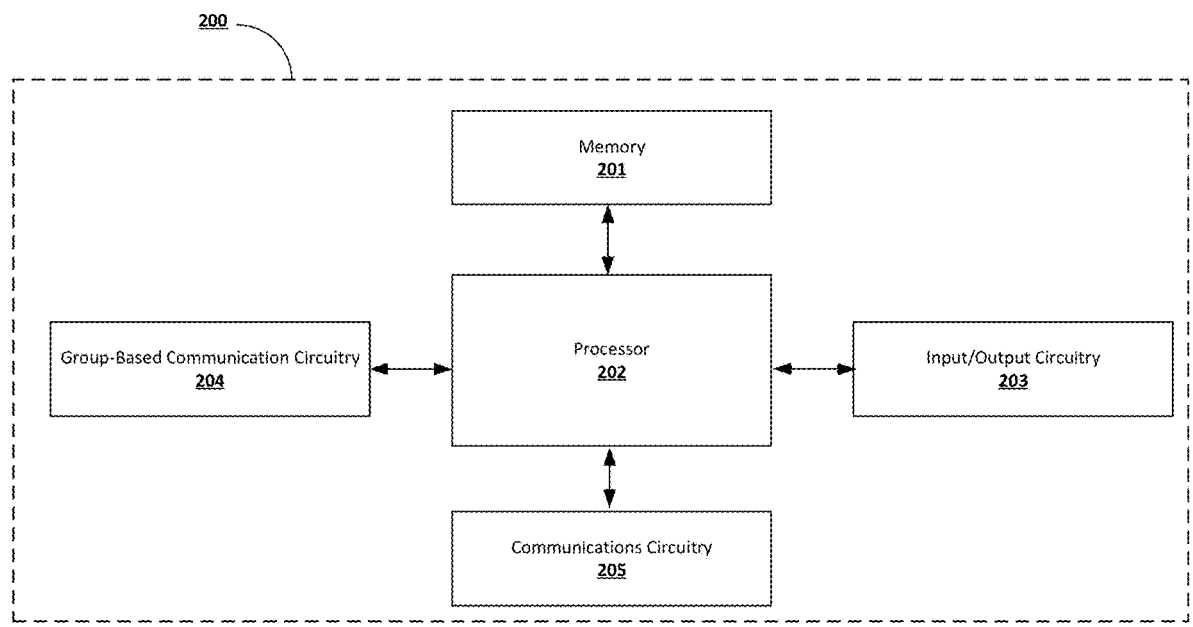

FIG. 2 depicts an exemplary apparatus for a group-based communication server according to some embodiments of the present disclosure.

Figure 3:
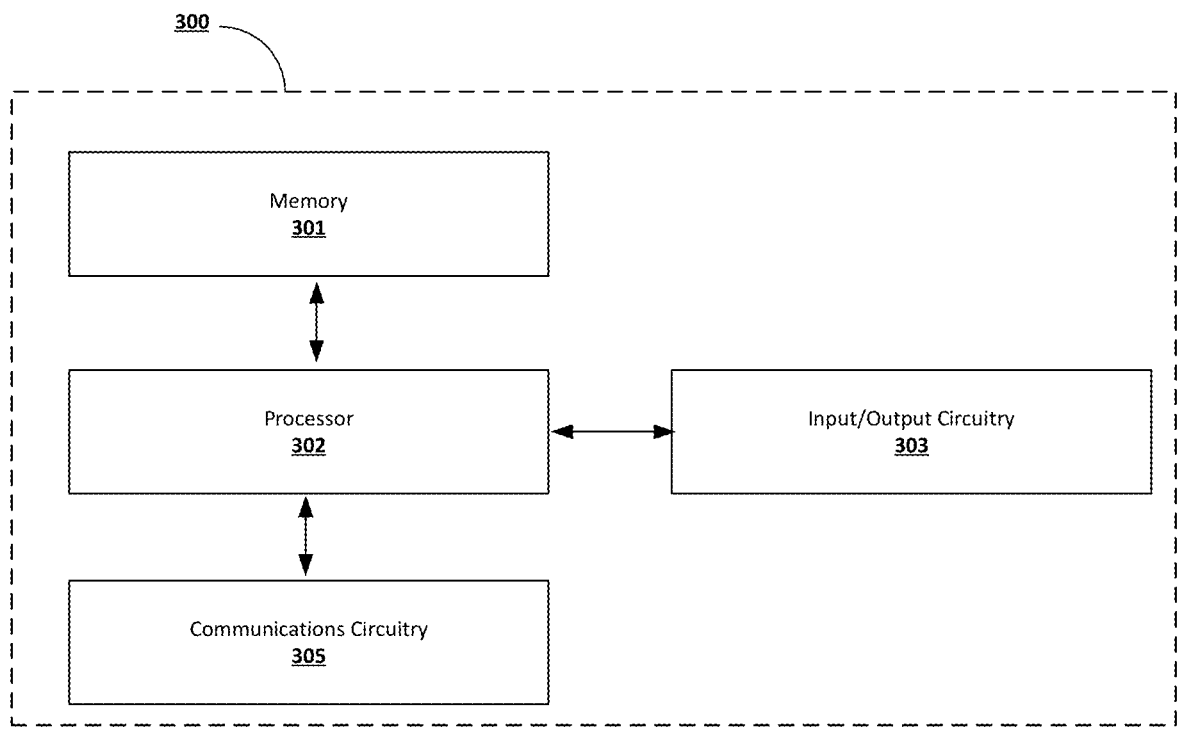

FIG. 3 depicts an exemplary apparatus for a client computing device according to some embodiments of the present disclosure.

Figure 4:
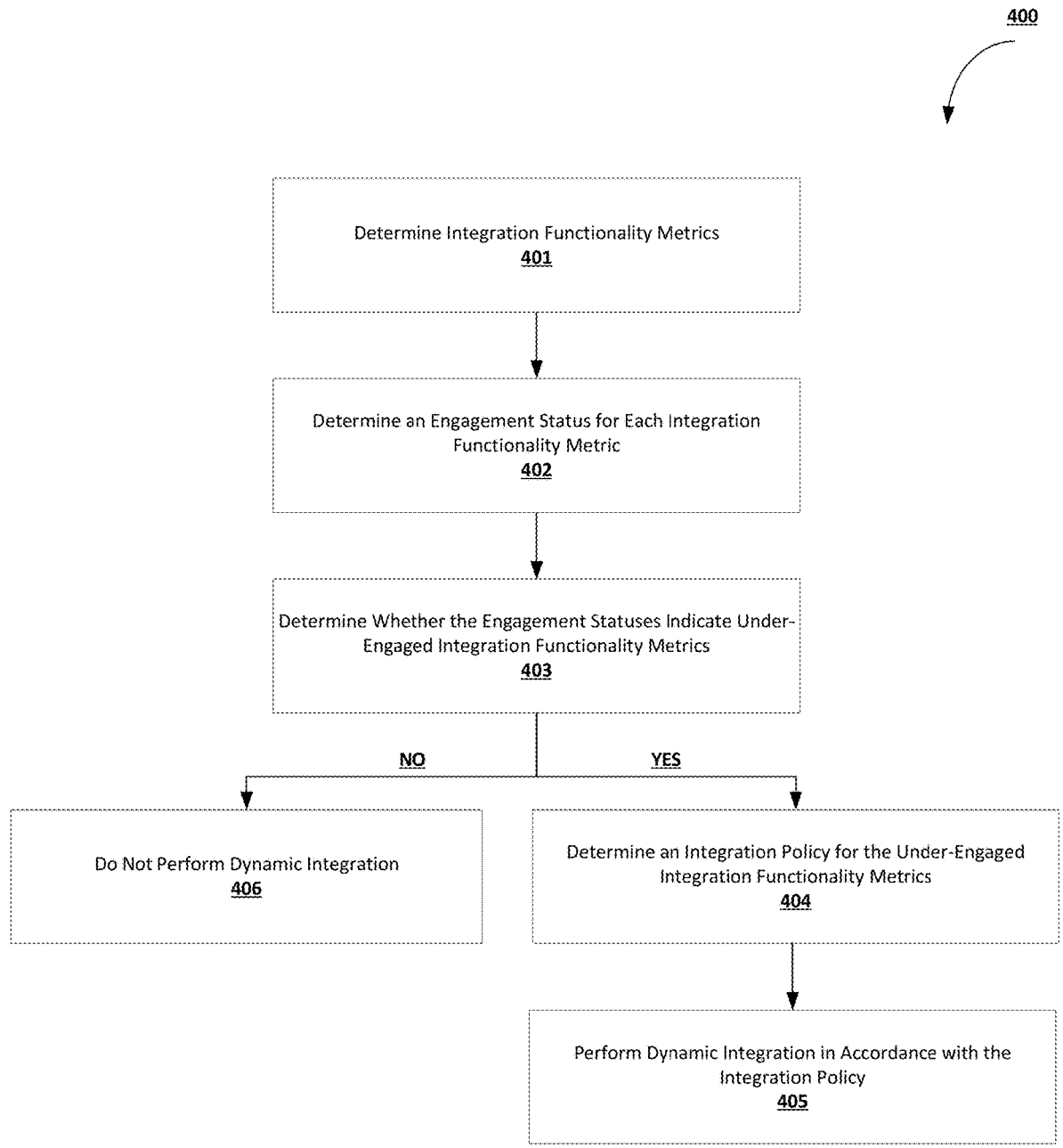

FIG. 4 is a flowchart diagram of an example process for performing dynamic user integration in a group-based communication system according to some embodiments of the present disclosure.

Figure 5:
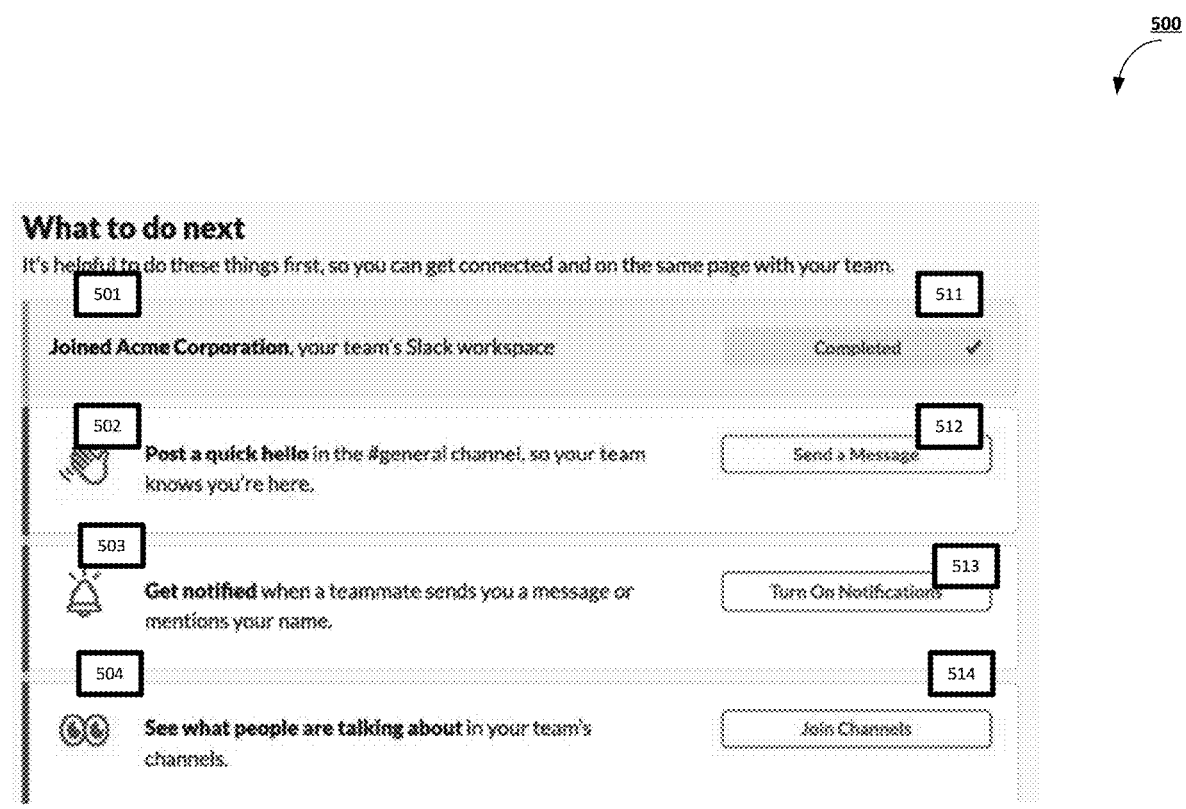

FIG. 5 is an operational example of an engagement tracking user interface according to some embodiments of the present disclosure.

Figure 6:
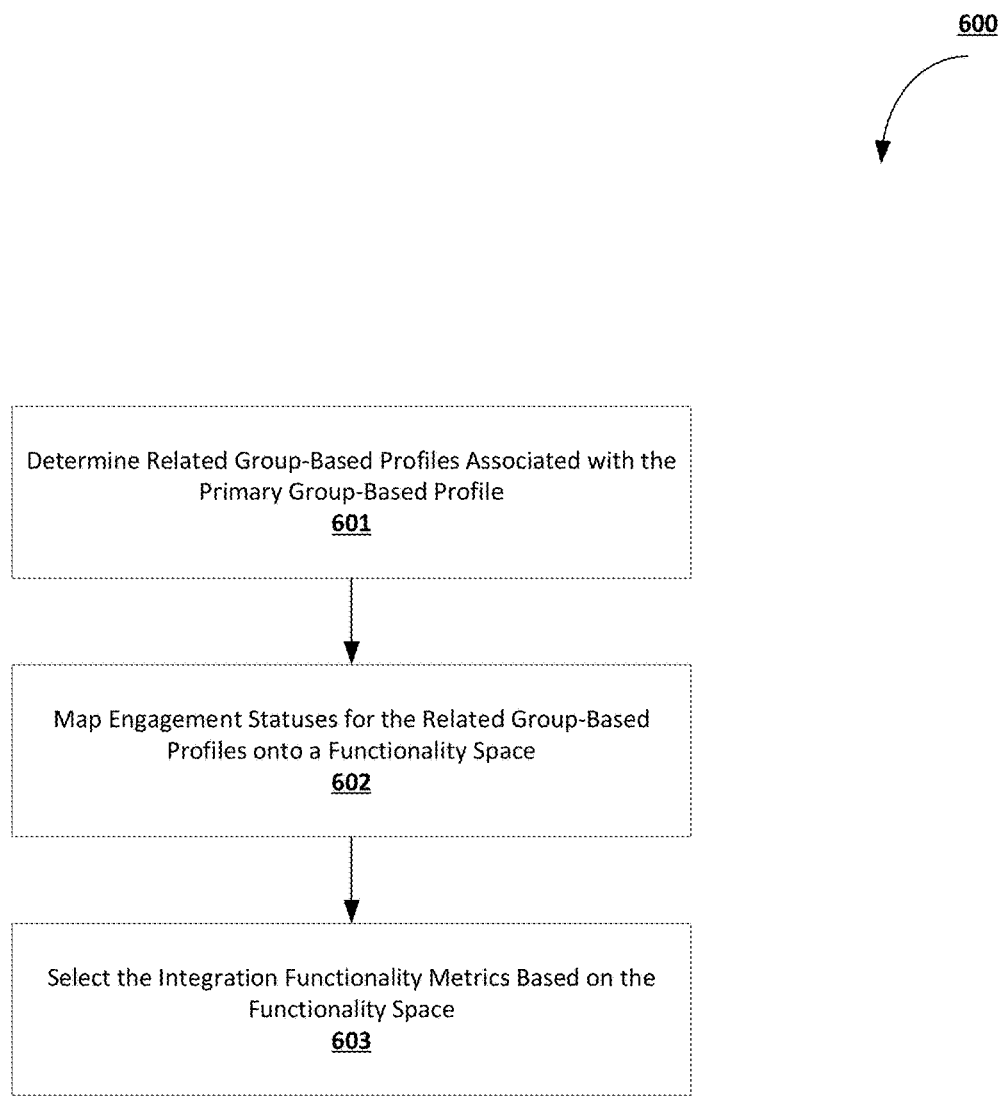

FIG. 6 is a flowchart diagram of an example process for determining integration functionality metrics according to some embodiments of the present disclosure.

Figure 7:
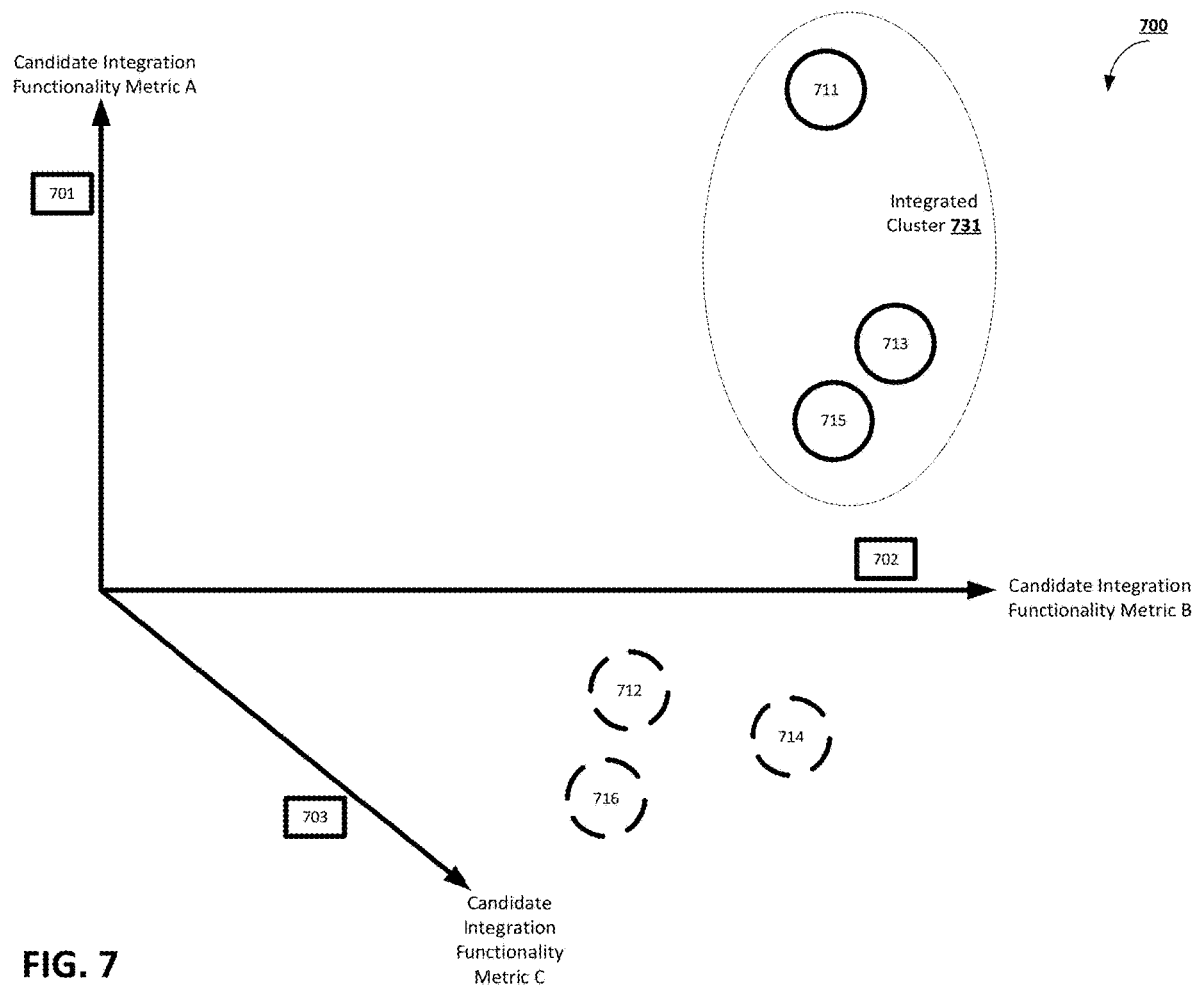

FIG. 7 is an operational example of a functionality space according to some embodiments of the present disclosure.

Figure 8:
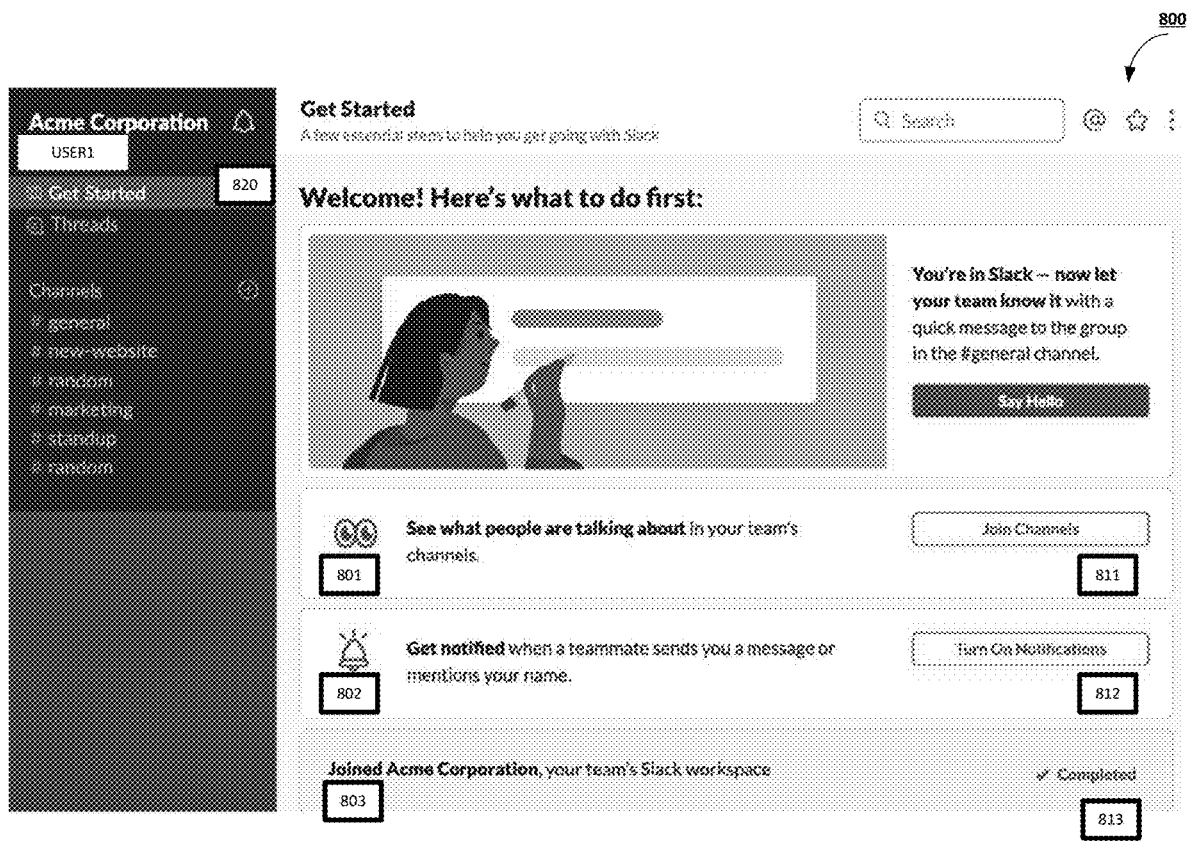

FIG. 8 is an operational example of a dynamic user integration portal according to some embodiments of the present disclosure.

Figure 9:
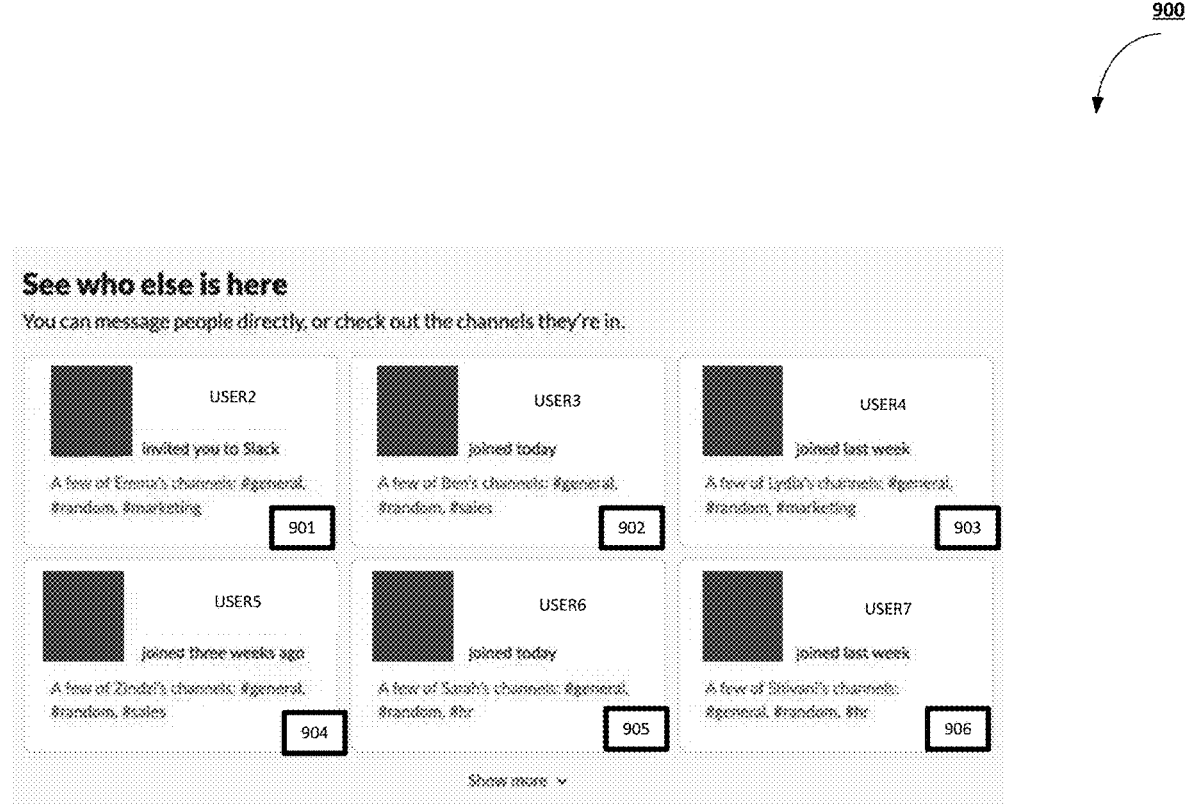

FIG. 9 is an operational example of a connection recommendation user interface according to some embodiments of the present disclosure.

Figure 10:
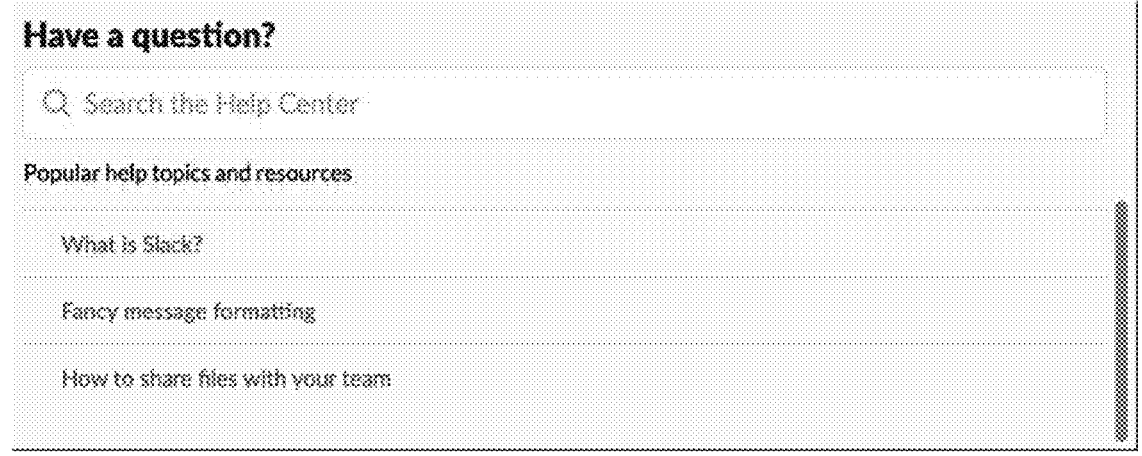

FIG. 10 is an operational example of an integration guidance user interface according to some embodiments of the present disclosure.

FIGS. 11A-11G provide operational examples of permetric engagement tracking user interface elements according to some embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," "payload object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client computing device" refers to computer hardware and/or software that is configured to access a service made available by a server. The server is often (but not always) on another computer system, in which case the client computing device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client computing devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client computing devices. Each user of the group-based communication system is associated with at least one group identifier. Each group identifier is a unique number. For example, in one embodiment, the group identifier may be stored as a 64-bit unsigned integer and represented externally (outside of memory) as a base-34 encoded string.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client computing device and that is configured for display within a group-based communication channel. Message communications may include any text, image, video, audio or combination thereof provided by a user (using a client computing device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication repository" refers to a location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data is stored in a single remote location or a plurality of remote locations. Alternatively, in some embodiments, the group-based communication repository may be distributed over a plurality of remote storage locations only.

The term "group-based user profile" refers to a data object that uniquely identifies a corresponding user of a group-based communication system and enables the corresponding user to access designated contents and/or functionalities of the group-based communication system. A group-based user profile may enable a corresponding user to login to the group-based communication system and interact with various software and hardware functionalities provided by the group-based communication system. The group-based communication system may enable a user to have access to particular digital information in accordance with user authorization information defined in part based on the group-based user profile of the user. For example, the group-based communication system may associate the group-based user profile with one or more group-based communication interfaces and accordingly grant the group-based system user-profile access to contents of the one or more group-based communication interfaces.

The term "dynamic user integration" refers to any group of one or more computer-implemented processes configured to enhance engagement of a group-based user profile with at least a portion of contents and/or functionalities of a group-based communication system based on at least one inferred behavioral feature and/or at least one inferred demographic feature of the group-based user profile. For example, a group-based communication system may perform dynamic user integration of a group-based user profile in one or more of the following circumstances: (i) when the group-based communication system detects that a group-based user profile has recently joined the group-based communication system, (ii) when the group-based communication system detects that a group-based user profile has recently joined a group-based communication interface within the group-based communication system, (iii) when the group-based communication system detects that a group-based user profile has not had sufficient prior engagements with particular contents and/or functionalities of the group-based communication system, and (iv) when the group-based communication system detects that a group-based user profile has recently been granted permission to access particular contents and/or functionalities of the group-based communication system.

The term "integration functionality metric" refers to data that identify particular contents and/or particular functionalities of a group-based communication system whose engagement by a group-based user profile is deemed critical to performing dynamic user integration of the group-based user profile with respect to the group-based communication system. For example, a group-based communication system may determine that posting a message to a group-based communication channel, sending a private message, installing particular plugin applications associated with the group-based communication, integrating particular external applications into the group-based communication system, and/or confirming email notification settings are critical to performing dynamic user integration of a particular group-based user profile with respect to the group-based communication system. In some embodiments, at least some of the integration functionality metrics for a particular group-based user profile are determined based on at least one inferred behavioral feature and/or at least one inferred demographic feature of the particular group-based user profile.

The term "engagement status" refers to data that describe a level of engagement of a corresponding group-based user profile with a corresponding integration functionality metrics. For example, an engagement status associated with a channel posting integration functionality metric may indicate one or more of whether a corresponding group-based user profile has posted a message to a group-based communication channel at all, whether a corresponding group-based user profile has posted a message to a group-based communication channel within a particular period of time, how many times a corresponding group-based user profile has posted a message to a group-based communication channel, etc. As another example, an engagement status associated with a private messaging integration functionality metric may indicate one or more of whether a corresponding group-based user profile has sent a private message at all, whether a corresponding group-based user profile has sent a private message within a particular period of time, how many times a corresponding group-based user profile has sent a private message, an average length of private messages posted by a corresponding group-based user profile, an average response rate of a corresponding group-based user profile to private messages, an average response time of a corresponding group-based user profile, etc.

The term "under-engaged integration functionality metric" refers to data that identify an engagement functionality metric whose respective engagement status with respect to a corresponding group-based user profile fails to satisfy predefined engagement status criteria. For example, when the engagement status for a particular engagement functionality metric is a numerical value, the particular engagement functionality metric may be an under-engaged integration functionality metric when the engagement status for the particular engagement functionality metric fails to exceed an engagement status threshold. As another example, when the engagement status for a particular engagement functionality metric is a categorical value, the particular engagement functionality metric may be an under-engaged integration functionality metric when the engagement status for the particular engagement functionality metric indicates a categorical value that is deemed to indicate insufficient engagement of the corresponding group-based user profile with the corresponding contents and/or functionalities of the group-based communication system that are associated with the particular engagement functionality metric.

The term "integration policy" refers to one or more computer-implemented processes that are configured to render at least one integration notification corresponding to each under-engaged integration functionality metric associated with a corresponding group-based user profile. For example, given a detection of an under-engaged integration functionality metric associated with posting messages to group-based communication channels with respect to a particular group-based user profile, the integration policy for the particular group-based user profile may be configured to render one or more of an integration notification on a home page interface of a group-based communication system presented to the particular group-based user profile that encourages the particular group-based user profile to post a message to a group-based communication channel, an integration notification presented as a push notification on a computing device of the particular group-based user profile that encourages the particular group-based user profile to post a message to a group-based communication channel, an integration notification upon detecting a particular pattern of user activity by the particular group-based user profile that encourages the particular group-based user profile to post a message to a group-based communication channel, etc.

The term "integration notification" refers to data describing one or more user interface elements configured to be rendered for a group-based user profile as part of an integration policy, where the one or more user interface elements are configured to encourage engagement of a corresponding under-engaged integration functionality metric by the corresponding group-based user profile. In some embodiments, at least one of timing, rendering technique, and contents of an integration notification are determined based on at least one inferred behavioral feature and/or at least one inferred demographic feature of the corresponding group-based user profile. In some embodiments, an integration notification includes user interface elements presented as part of a "Welcome" page or "Welcome" tab of a user interface presented by a group-based communication system, as one or more push notifications, as one or more email communications, etc.

The term "indexed integration notification" refers to data describing an integration notification that is configured to be presented using a dynamic user integration portal. In some embodiments, at least a portion of the indexed integration notifications may correspond to one or more of particular under-engaged integration functionality metrics deemed to be most critical to performing dynamic user integration, particular under-engaged integration functionality metrics whose respective engagement statuses indicates maximal levels of insufficient engagement, etc.

The term "dynamic user integration portal" refers to data describing a user interface of a group-based communication system that is primarily configured to present at least some of the integration notifications, e.g., indexed integration notifications. For example, a dynamic user integration portal may be a "Welcome" page and/or a "Welcome" tab rendered by a group-based communication system configured that is primarily configured to present integration notifications. As another example, a dynamic user integration portal may be a home page and/or a home tab rendered by a group-based communication system configured that is primarily configured to present integration notifications. In some embodiments, the dynamic user integration portal is configured to render only those particular integration notifications that correspond to one or more of particular under-engaged integration functionality metrics deemed to be most critical to performing dynamic user integration, particular under-engaged integration functionality metrics whose respective engagement statuses indicates maximal levels of insufficient engagement, etc.

The term "prioritized resource allocation status" refers to data describing that performing particular functionalities of the group-based communication system should be prioritized to performing one or more other functionalities of the group-based communication system. For example, configuration data for a group-based communication system may indicate that particular user interfaces associated with the group-based communication system (e.g., the dynamic user integration portal) should be prioritized to performing other functionalities of the group-based communication system. As another example, configuration data for a group-based communication system may indicate that transmitting data associated particular user interfaces associated with the group-based communication system (e.g., the dynamic user integration portal) and/or rendering particular user interfaces associated with the group-based communication system should be performed using a designated resource allocation guarantee and/or with a particular quality of service guarantee.

The term "triggering user interaction" refers to data recording an interaction of a group-based user profile with a group-based communication system configured to cause rendering of an integration notification associated with a corresponding under-engaged integration functionality metric. For example, configuration data for a group-based communication system may require that, upon detecting that a user has received a message regarding scheduling a meeting, the group-based communication system should generate an integration notification associated with a calendar application integration functionality metric. As another example, configuration data for a group-based communication system may require that, upon detecting that a user has scrolled to the lower edge of a user interface for a group-based communication channel, the group-based communication system should generate an integration notification associated with a channel posting integration functionality metric.

The term "integrative user interaction" refers to data recording an interaction of a group-based user profile with a group-based communication system configured to interact with and/or access particular contents and/or functionalities of the group-based communication system. For example, particular integrative user interaction may record user interaction with particular contents and/or functionalities associated with an under-engaged integration functionality metric. An integrative user interaction may include selecting an icon associated with the corresponding particular contents and/or functionalities of the group-based communication system, performing actions corresponding to the particular contents and/or functionalities of the group-based communication system (e.g., posting messages, sending private messages, etc.), etc.

The term "candidate integration functionality metric" refers to data identifying particular contents and/or particular functionalities of a group-based communication system. Examples of candidate integration functionality metrics include a message posting candidate integration functionality metric, a private message sending candidate integration functionality metric, a candidate integration functionality metric associated with installing of a particular plugin application, a candidate integration functionality metric associated with integration of a particular external application, a candidate integration functionality metric associated with a particular usage level of one or more particular contents and/or particular functionalities of a group-based communication system, etc.

The term "functionality space" refers to data identifying engagement statuses of one or more group-based user profiles with respect to one or more candidate integration functionality metrics. For example, the functionality space may identify a multi-dimensional space, where each dimension of the multi-dimensional space is associated with a candidate integration functionality metric of a group of candidate integration functionality metrics, and where each point in the multi-dimensional space corresponds to a particular combination of engagement statuses for each candidate integration functionality metric of the group of candidate integration functionality metrics. The functionality space may be used to perform cross-profile inferences between various group-based user profiles in order to determine integration functionality metrics for a particular group-based user profile.

Overview

Various embodiments of the present disclosure generally relate to a method, apparatus, and system for performing dynamic user integration in a group-based communication system. However, a person of ordinary skill in the relevant technology will recognize that various techniques described herein may be used to perform dynamic user integration in various other software applications, such as various complex software applications that provide numerous functionalities.

Dynamic user integration is a consequential yet complex problem for software application development, especially with respect to complex software application frameworks. Most complex software application frameworks offer a suite of functionalities. For example, many group-based communication systems provide various group-based communication interfaces, group-based communication channels, plugin software applications, external application integration functionalities, private messaging functionalities, social media functionalities, storage functionalities, etc. In such complex software application frameworks, each provided functionality incurs a respective share of operational costs on the overall application architecture for the complex software application framework, such as on application server computing devices, any client computing devices, as well as any network infrastructure used to enable communications between the application server computing devices and the client computing devices. Without effective and efficient dynamic user integration, such incurred costs fail to translate into superior user experience for users of complex software application frameworks. Consequently, software application frameworks incur unnecessary costs in terms of computational complexity and storage complexity, which in turn undermine operational efficiency and effective usage throughput of the frameworks. Thus, effective and efficient dynamic user integration is critical to operational efficiency of various software application frameworks applications, such as various complex software application frameworks. Absence of suitable techniques for effective and efficient dynamic user integration has undermined operational efficiency and reduced effective usage throughput of software application frameworks.

Various embodiments of the present disclosure improve operational efficiency and effective usage throughput of complex software application frameworks by providing efficient and effective dynamic user integration techniques. The provided dynamic user integration techniques include efficient and effective techniques for detecting a current user integration state for a particular user profile as well as efficient and effective techniques for translating the detected current user integration state into user interactions that enhance the current user integration state. In doing so, various embodiments of the present invention enhance efficiency of complex software application frameworks as well as application solutions for performing dynamic user integration in various complex software application frameworks.

For example, various embodiments of the present disclosure provide techniques for performing dynamic user integration that utilize integration functionality metrics associated with a selected subset of functionalities provided by a complex software application framework to detect current user integration state. Utilizing a selected subset of applications functionalities to detect current user integration states can minimize the range of functionality-related metrics that a software application monitors in order to detect current user integration states, thus improving efficiency of performing dynamic user integration with respect to complex software application frameworks.

As another example, various embodiments of the present disclosure provide techniques for performing dynamic user integration that utilize integration notifications generated based on user interaction models to translate detected current user integration states into effective user interactions configured to increase user integration. In doing so, the noted embodiments of the present disclosure can reduce the problem of translating detected current user integration states into effective user interactions into a one-to-one mapping and/or one-to-many mapping task between a user integration state space and a user interaction space, thus enhancing efficiency of performing the noted process of translating detected current user integration states into effective user interactions.

As yet another example, various embodiments of the present disclosure provide techniques for updating engagement statuses of integration functionality metrics over time based on incoming user interaction data. Such techniques enhance efficiency and effective of dynamic user integration by enabling iterative updates of engagement statuses which in turn eliminates a need for costly re-trainings of entire structures of integration models. To maintain effectiveness of dynamic user integration in large software application frameworks having a large number of users, it is also important that the dynamic user integration model used to perform dynamic user integration be updatable in real-time based on past modeling data as well as incoming user interaction data. Various embodiments of the present disclosure enable such real-time updates in an operationally efficient yet effective manner. In doing so, various embodiments of the present invention enhance efficiency of complex software application frameworks as well as application solutions for performing dynamic user integration in various software application frameworks, such as various complex software application frameworks.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example architecture 100 for performing various embodiments of the present disclosure may operate. Users may access a group-based communication system 105 via a communications network (not shown) using one or more client computing devices, such as client computing devices 102A-102C. The group-based communication system 105 may comprise a group-based communication server 106 in communication with at least one group-based communication repository 107.

Communications network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication server 106 may be embodied as a computer or computers. The group-based communication server 106 may provide for receiving of electronic data from various sources, including but not necessarily limited to the client computing devices 102A-102C. For example, the group-based communication server 106 may be operable to receive and post or transmit group-based messaging communications provided by the client computing devices 102A-102C.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client computing devices 102A-102C may be any computing device as defined above. Electronic data received by the group-based communication server 106 from the client computing devices 102A-102C may be provided in various forms and via various methods. For example, the client computing devices 102A-102C may include desktop computers, laptop computers, smartphones, netbooks, tablet computers, wearables, and the like. In embodiments where a client computing device 102A-102C is a mobile device, such as a smartphone or tablet, the client computing device 102A-102C may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client computing device 102A-C may interact with the group-based communication system 105 via a web browser. As yet another example, the client computing device 102A-102C may include various hardware or firmware designed to interface with the group-based communication system 105.

In some embodiments of an exemplary group-based communication system 105, a message or messaging communication may be sent from a client computing device 102A-102C to a group-based communication system 105. In various implementations, the message may be sent to the group-based communication system 105 over communications network 104 directly by a client computing device 102A-102C, the message may be sent to the group-based communication system 105 via an intermediary such as a message server, and/or the like. For example, the client computing device 102A-102C may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client computing device 102A-102C may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
```

```
        </client_details>
        <message>
            <message_identifier>ID_message_10</message_identifier>
            <team_identifier>ID_team_1</team_identifier>
            <channel_identifier>ID_channel_1</channel_identifier>
            <contents>That is an interesting disclosure. I have attached a copy our patent
policy.</contents>
            <attachments>patent_policy.pdf</attachments>
        </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have
attached a copy our patent policy.</contents>
    <attachments>patent_policy.pdf</attachments>
    <conversation_primitive>
        conversation includes messages: ID_message_8,
        ID_message_9, ID_message_10,
            ID_message_11, ID_message_12
    </conversation_primitive>
</storage_message>
```

In embodiments, a group identifier as defined above may be associated with the message. In embodiments, a group-based communication channel identifier as defined above may be associated with the message. In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message. In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message. In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client computing devices 102A-102C to enable message sharing therebetween. The processor 202 ensures that messages intended for exchange between the client computing devices 102A-102C within the particular communication channel are properly disseminated to those client computing devices 102A-102C for display within respective display windows provided via the client computing devices 102A-102C.

Moreover, the processor 202 may be configured to synchronize messages exchanged on a particular communication channel with a database for storage and/or indexing of messages therein. In certain embodiments, the processor 202 may provide stored and/or indexed messages for dissemination to client computing devices 102A-102C.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client computing device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Client Computing Device Overview

A client computing device 102A-102C may include one or more computing systems, such as the apparatus 300 shown in FIG. 3. The apparatus 300 may include a processor 302, a memory 301, input/output circuitry 303, and communications circuitry 305. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 301 may provide storage functionality, the communications circuitry 305 may provide network interface functionality, and the like.

In some embodiments, the processor 302 (and/or co-processor or any other processing circuitry assisting or otherwise associated with the processor) may be in communication with the memory 301 via a bus for passing information among components of the apparatus. The memory 301 may be non-transitory and may include, for example, one or more volatile and/or non-volatile memories. In other words, for example, the memory may be an electronic storage device (e.g., a computer readable storage medium). The memory 301 may be configured to store information, data, content, applications, instructions, or the like, for enabling the apparatus 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 301 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 303 that may, in turn, be in communication with processor 302 to provide output to the user and, in some embodiments, to receive an indication of a user input. The input/output circuitry 303 may comprise a user interface and may include a display and may comprise a web user interface, a mobile application, a client computing device, a kiosk, or the like. In some embodiments, the input/output circuitry 303 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 301, and/or the like).

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network. For example, the communications circuitry 305 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Exemplary System Operations

Various embodiments of the present disclosure generally relate to a method, apparatus, and system for performing dynamic user integration in a group-based communication system. However, a person of ordinary skill in the relevant technology will recognize that various techniques described herein may be used to perform dynamic user integration in various other software applications, such as various complex software applications that provide numerous functionalities.

As described above, various embodiments of the present disclosure improve operational efficiency of complex software application frameworks by providing efficient and effective dynamic user integration techniques. The provided dynamic user integration techniques include efficient and effective techniques for detecting a current user integration state for a particular user profile as well as efficient and effective techniques for translating the detected current user integration state into user interactions that enhance the current user integration state. In doing so, various embodiments of the present invention enhance efficiency of complex software application frameworks as well as application solutions for performing dynamic user integration in various complex software application frameworks.

FIG. 4 is a flowchart diagram of an example process 400 for performing dynamic user integration in a group-based communication system. Via the various operations of process 400, the group-based communication server 106 can generate and perform integration policies configured to increase engagement of group-based user profiles with some or all of contents and/or functionalities of the group-based communication system 105.

The process 400 begins at operation 401 when the group-based communication server 106 determines one or more integration functionality metrics associated with a group-based user profile. In some embodiments, to determine the integration functionality metrics associated with a group-based user profile, the group-based communication server 106 first determines an integration-related category of the group-based user profile, where the integration-related category of the group-based user profile may determine a purpose behind the need for performing dynamic user integration for the group-based user profile. For example, the group-based communication server 106 may determine that a particular group-based user profile belongs to an integration-related category associated with recently joined members of the group-based communication system 105. As another example, the group-based communication server 106 may determine that a particular group-based user profile belongs to an integration-related category associated with members of the group-based communication system 105 deemed to have low interactions with particular contents and/or functionalities of the group-based communication system 105. As a further example, the group-based communication server 106 may determine that a particular group-based user profile belongs to an integration-related category associated with members of the group-based communication system 105 that have recently been given access to particular contents and/or functionalities of the group-based communication system 105. An integration functionality metric may identify particular contents and/or particular functionalities of a group-based communication system 105 whose engagement by a group-based user profile is deemed critical to performing dynamic user integration of the group-based user profile with respect to the group-based communication system 105.

Example integration functionality metrics for a particular group-based user profile are depicted in the example engagement tracking user interface 500 of FIG. 5. As depicted in FIG. 5, the engagement tracking user interface 500 identifies four integration functionality metrics 501-504 each associated with a respective engagement status 511-514. For example, the integration functionality metric 501 relates to utilizing the functionality of joining a particular group-based communication interface and is associated with an engagement status 511 that indicates completed engagement of the group-based user interface with the functionality of joining the particular group-based communication interface. In addition, the integration functionality metric 502 relates to utilizing the functionality of posting a message in a particular group-based communication channel and is associated with an engagement status 512 that indicates lack of engagement of the group-based user interface with the functionality of posting a message in the particular group-based communication channel. Furthermore, the integration functionality metric 503 relates to utilizing the functionality of configuring notification settings for the group-based communication system 105 and is associated with an engagement status 513 that indicates lack of engagement of the group-based user interface with the functionality of configuring the notification settings for the group-based communication system 105. Moreover, the integration functionality metric 504 relates to utilizing the functionality of joining a group-based communication channel and is associated with an engagement status 514 that indicates lack of engagement of the group-based user interface with the functionality of joining a group-based communication channel. As depicted in the engagement statuses 512-514, an incomplete engagement status 512-514 may further be used to provide a link to perform engagement with a corresponding integration functionality metric.

Figure 11A:
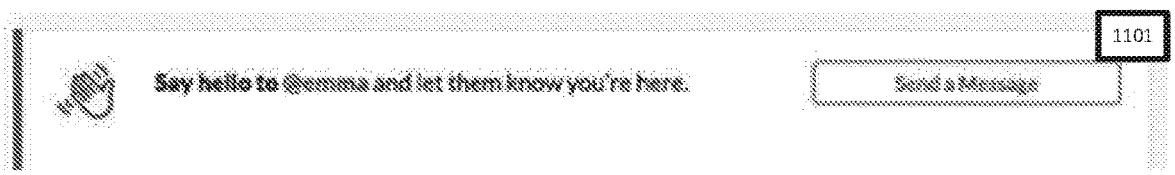
Figure 11B:
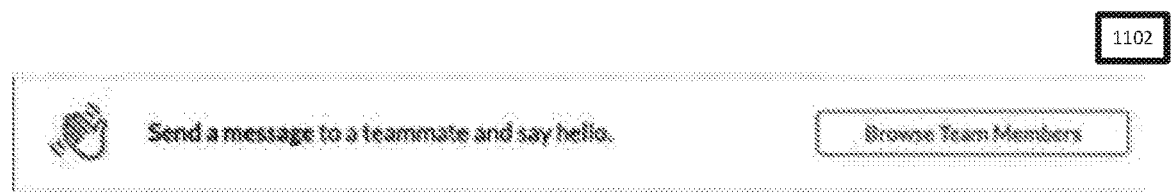
Figure 11C:
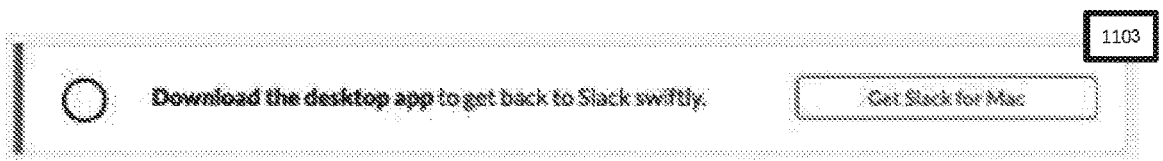
Figure 11D:
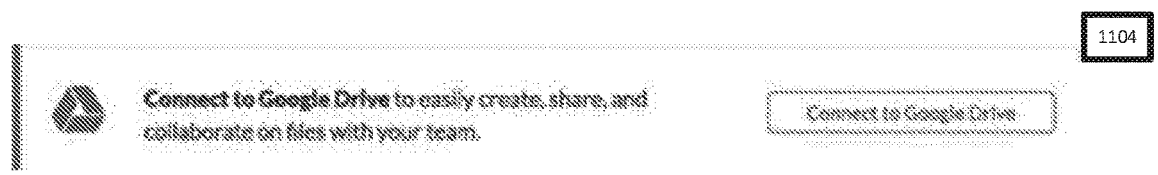
Figure 11E:
Figure 11F:
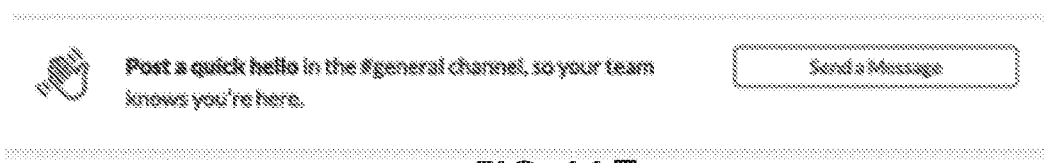
Figures 11G, 11H:
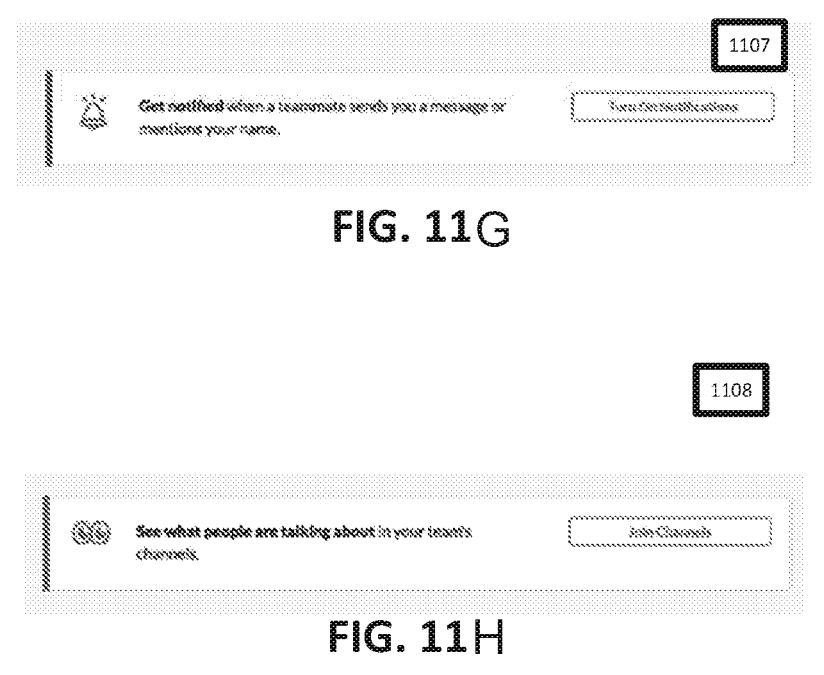

Other examples of integration functionality metrics are depicted in FIGS. 11A-11G. FIG. 11A provides an engagement tracking user interface element 1101 associated with a targeted-message-sending integration functionality metric; FIG. 11B provides an engagement tracking user interface element 1102 associated with a general-message-sending integration functionality metric; FIG. 11C provides an engagement tracking user interface element 1103 associated with an external-application-installing integration functionality metric; FIG. 11D provides an engagement tracking user interface element 1104 associated with an external-application-connecting integration functionality metric; FIG. 11E provides an engagement tracking user interface element 1105 associated with an external-application-linking integration functionality metric; FIG. 11F provides an engagement tracking user interface element 1106 associated with an channel-message-posting integration functionality metric; FIG. 11G provides an engagement tracking user interface element 1107 associated with a notification-configuration integration functionality metric; and FIG. 11H provides an engagement tracking user interface element 1108 associated with a channel-joining integration functionality metric.

In some embodiments, operation 401 may be performed at least in part based on the operations of process 600 depicted in FIG. 6, which is an example process of determining one or more integration functionality metrics associated with a particular group-based user profile. As depicted in FIG. 6, the process 600 begins at operation 601 when the group-based communication server 106 determines one or more related group-based user profiles associated with the particular group-based user profile. In some embodiments, the group-based communication server 106 determines the related group-based user profiles associated with the particular group-based user profile based on a user similarity measure between the particular group-based user profile and each of one or more other group-based user profiles associated with the group-based communication system 105.

In some embodiments, to determine the user similarity measure between a first group-based user profile and a second group-based user profile, the group-based communication server 106 determines a measure of shared membership of both of the two group-based user profiles in particular group-based communication interfaces and/or group-based communication channels and uses the measure of shared membership to determine the user similarity measure of the two group-based user profiles, such that two group-based user profiles having a high number of mutually-joined group-based communication interfaces and/or group-based communication channels are likely to have a high user similarity measure associated with them. In some embodiments, to determine the user similarity measure between a first group-based user profile and a second group-based user profile, the group-based communication server 106 determines a measure of shared activity of both of the two group-based user profiles across the group-based communication system 105, such that two group-based user profiles having a high number of mutually-joined group-based communication interfaces and/or group-based communication channels that are nevertheless relatively inactive in the noted mutually-joined group-based communication interfaces and/or group-based communication channels are likely to have a low user similarity measure associated with them.

In some embodiments, the group-based communication server 106 determines the user similarity measure between a first group-based user profile and a second group-based user profile based on at least one of a measure of shared membership between the two group-based user profiles, a measure of shared activity between the two group-based user profiles, a measure of shared demographic properties between the two group-based user profiles, and a measure of shared activity patterns between the two group-based user profiles. For example, the group-based communication server 106 may determine an aspect of user similarity measure between a first group-based user profile and a second group-based user profile based on determining that the two group-based user profiles reside in the same geographic area, work in the same institution, use the same communication network, etc. As another example, the group-based communication server 106 may determine an aspect of user similarity measure between a first group-based user profile and a second group-based user profile based on determining that the two group-based user profiles are low-activity users, that the two group-based user profiles primarily use the group-based communication system 105 for a particular purpose (e.g., for scheduling meetings), that the two group-based user profiles primarily use the group-based communication system 105 during a particular time of day, etc.

At operation 602, the group-based communication server 106 maps each of the related group-based user profiles onto a functionality space. In some embodiments, the group-based communication server 106 generates the functionality space as a multi-dimensional space having a set of feature dimensions each corresponding to an engagement status for a respective candidate integration functionality metric, where each candidate integration functionality metric is associated with one or more designated contents and/or one or more designated functionalities of the group-based communication system 105. The group-based communication server 106 then maps each related group-based user profile to a designated point in the multi-dimensional space, where each dimension value defining an aspect of the position of the designated point in the multi-dimensional space corresponds to an engagement status of a related group-based user profile associated with the designated point with respect to a candidate integration functionality metric associated with the dimension value. An operational example of a functionality space 700 is depicted in FIG. 7. As depicted in FIG. 7, the functionality space 700 has three dimensions 701-703 each associated with a respective candidate integration functionality metric, i.e., dimension 701 associated with the candidate integration functionality metric A, dimension 702 associated with the candidate integration functionality metric B, and dimension 703 associated with the candidate integration functionality metric A. Moreover, the functionality space 700 includes six designated points 711-716 each associated with a respective related group-based user profile.

At operation 603, the group-based communication server 106 selects the integration functionality metrics from the candidate integration functionality metrics and based on the functionality space. In some embodiments, to select the integration functionality metrics, the group-based communication server 106 updates the functionality space by adding a set of observation dimensions corresponding to observed integration intensity measures of the related group-based user profiles, performs regression analysis based on the updated functionality space to determine a correlation weight for each of the candidate integration functionality metrics with respect to the observed integration intensity measures, and selects the candidate integration functionality metrics whose respective correlation weights exceed a threshold value as the integration functionality metrics. In some embodiments, to select the integration functionality metrics, the group-based communication server 106 updates the functionality space by adding a set of observation dimensions corresponding to observed integration intensity measures of the related group-based user profiles, performs regression analysis based on the updated functionality space to determine a correlation weight for each of the candidate integration functionality metrics with respect to the observed integration intensity measures, and selects the candidate integration functionality metrics having a preconfigured number of the highest respective correlation weights as the integration functionality metrics.

In some embodiments, an observed integration intensity measure for a group-based user profile of the group-based communication system 105 is determined based on at least one of length of time the group-based user profile has been a member of the group-based communication system 105, length of time spent by the group-based user profile accessing contents and/or functionalities associated with the group-based communication system 105, magnitude of financial commitment by the group-based user profile or a related entity incurred with respect to the group-based communication system 105, a ratio of available functionalities of the group-based communication system that have been utilized by the group-based user profile, a ratio of available functionalities of the group-based communication system that have been heavily utilized by the group-based communication system 105, etc. In some embodiments, at least a portion of observed integration intensity measure is generated based on survey response data by at least some of the group-based user profiles of the group-based communication system.

In some embodiments, to select the integration functionality metrics, the group-based communication server 106 first selects a subset (e.g., cluster) of the related group-based user profiles whose respective observed integration intensity measures exceed a threshold value and/or a subset of the related group-based user profiles having a preconfigured number of highest respective observed integration intensity measures as an integrated cluster of the related group-based user profiles. The group-based communication server 106 then selects a subset of the candidate integration functionality metrics having the highest average values across all of the related group-based user profiles associated with the integrated cluster as the integration functionality metrics. For example, as depicted in the exemplary functionality space 700 of FIG. 7, the integrated cluster 731 includes the designated points 711, 713, and 715. In the depicted operational, to select integration functionality metrics from the candidate integration functionality metrics, the group-based communication server 106 may take note of the detection that the candidate integration functionality metric B associated with the dimension 702 has relatively high engagement status values across all of designated points 711, 713, and 715 in the integrated cluster 731, while the candidate integration functionality metric A associated with the dimension 701 has relatively high engagement status values across only the designated point 711 in the integrated cluster 731, and the candidate integration functionality metric C associated with the dimension 703 does not have relatively high engagement status values across any of three designated points 711, 713, 715 in the integrated cluster 731.

In some embodiments, if the group-based communication server 106 is configured to select the top two candidate integration functionality metrics having the highest average values across all of the related group-based user profiles associated with the integrated cluster 731, the group-based communication server 106 may process the functionality space 700 of FIG. 7 to select the candidate integration functionality metrics A-B as the integration functionality metrics. In some of those embodiments, the group-based communication server 106 may select the candidate integration functionality B as the top-priority integration functionality metric and the select the candidate integration functionality B as the second-top-priority integration functionality metric. In some embodiments, if the group-based communication server 106 is configured to select the top candidate integration functionality metrics having the highest average values across all of the related group-based user profiles associated with the integrated cluster 731, the group-based communication server 106 may process the functionality space 700 of FIG. 7 to select the candidate integration functionality metrics B as the sole integration functionality metric.

Returning to FIG. 4, at operation 402, the group-based communication server 106 determines an engagement status for the group-based user profile with respect to each integration functionality metric determined in operation 401. In some embodiments, the engagement status for an integration functionality metric describes a level of engagement of the group-based user profile with a corresponding integration functionality metrics. For example, an engagement status associated with a channel posting integration functionality metric may indicate one or more of whether a corresponding group-based user profile has posted a message to a group-based communication channel at all, whether a corresponding group-based user profile has posted a message to a group-based communication channel within a particular period of time, how many times a corresponding group-based user profile has posted a message to a group-based communication channel, etc. As another example, an engagement status associated with a private messaging integration functionality metric may indicate one or more of whether a corresponding group-based user profile has sent a private message at all, whether a corresponding group-based user profile has sent a private message within a particular period of time, how many times a corresponding group-based user profile has sent a private message, an average length of private messages posted by a corresponding group-based user profile, an average response rate of a corresponding group-based user profile to private messages, an average response time of a corresponding group-based user profile, etc.

In some embodiments, to determine an engagement status for a group-based user profile with respect to an integration functionality metric, the group-based communication server 106 processes usage history data associated the group-based user profile and/or the integration functionality metric. In some embodiments, to determine an engagement status for a group-based user profile with respect to an integration functionality metric, the group-based communication server 106 processes configuration data and/or installation status data associated with the group-based user profile. For example, to determine an engagement status for a group-based user profile with respect to a message posting integration functionality metric, the group-based communication server 106 may analyze usage history data associated with the group-based user profile to determine whether the group-based user profile has posted messages, the number of message posting by the group-based user profile, the frequency of message posting by the group-based user profile, etc. As another example, to determine an engagement status for a group-based user profile with respect to an application installation integration functionality metric, the group-based communication server 106 may analyze system configuration data to determine whether the group-based user profile has installed a corresponding application (e.g., a cloud storage management software application, such as Dropbox or Google Drop).

In some embodiments, the engagement status for a particular group-based user profile with respect to an integration functionality metric indicates usage intensity measure of contents and/or functionalities associated with the integration functionality metric by the particular group-based user profile. In some embodiments, the engagement status for a particular group-based user profile with respect to an integration functionality metric indicates a usage intensity measure of contents and/or functionalities associated with the integration functionality metric by the particular group-based user profile relative to usage intensity measures of the particular contents and/or functionalities associated with the integration functionality metric by one or more other group-based user profiles associated with the group-based communication system 105. For example, in some embodiments, the group-based communication server 106 may (e.g., in accordance with at least some of the techniques described in relation to step 601 of process 600 depicted in FIG. 6) determine related group-based user profiles associated with the particular group-based user profile. The group-based communication server 106 may subsequently determine a relative usage intensity measure of the particular contents and/or functionalities by the particular group-based user profile with respect to the usage intensity measures of the related group-based user profiles associated with the particular group-based user profile. The group-based communication server 106 may then utilize the relative usage intensity of the particular contents and/or functionalities associated with the integration functionality metric to determine an engagement status for the integration functionality metric. As another example, in some embodiments, the group-based communication server may a relative usage intensity measure of the particular contents and/or functionalities associated with the integration functionality metric by the particular group-based user profile with respect to the usage intensity measures of all other group-based user profiles associated with the group-based communication system to determine the engagement status for the integration functionality metric.

At operation 403, the group-based communication server 106 determines whether the engagement statuses determined in operation 402 indicate any under-engaged integration functionality metrics. An under-engaged integration functionality metric may be an engagement functionality metric whose respective engagement status with respect to a corresponding group-based user profile fails to satisfy predefined engagement status criteria. In some embodiments, predefined engagement status criteria for different integration functionality metrics having different priority values may be different and may be defined at least in part based on the priority statuses of the integration functionality metrics. For example, a top-priority integration functionality metric might have stricter predefined engagement status criteria (e.g., a higher predefined engagement status threshold) compared to a low-priority integration functionality metric.

In some embodiments, when the engagement status for a particular engagement functionality metric is a numerical value, the particular engagement functionality metric may be an under-engaged integration functionality metric when the engagement status for the particular engagement functionality metric fails to exceed an engagement status threshold. For example, if the engagement status for a channel posting integration functionality metric indicates one post a week, and if the predefined engagement status criteria for the channel posting integration functionality metric require five posts a week for the corresponding engagement status, the group-based communication server 106 may determine that the channel posting integration functionality metric is an under-engaged integration functionality metric. As another example, if the engagement status for a scheduling integration functionality metric indicates zero meetings scheduled using an external calendar management application, and if the predefined engagement status criteria for the scheduling integration functionality metric require at least one scheduled meeting, the group-based communication server 106 may determine that the scheduling integration functionality metric is an under-engaged integration functionality metric.

In some embodiments, when the engagement status for a particular engagement functionality metric is a categorical value, the particular engagement functionality metric may be an under-engaged integration functionality metric when the engagement status for the particular engagement functionality metric indicates a categorical value that is deemed to indicate insufficient engagement of the corresponding group-based user profile with the corresponding contents and/or functionalities of the group-based communication system that are associated with the particular engagement functionality metric. For example, if the engagement status for an application installation integration functionality metric indicates a non-installed status, and if the predefined engagement status criteria for the application installation integration functionality metric require an installed status for the corresponding engagement status, the group-based communication server 106 may determine that the application installation integration functionality metric is an under-engaged integration functionality metric. As another example, if the engagement status for a channel posting integration functionality metric indicates no past posts, and if the predefined engagement status criteria for the channel posting integration functionality metric require past posts, the group-based communication server 106 may determine that the channel posting integration functionality metric is an under-engaged integration functionality metric.

At operations 404-405, in response to determining in operation 403 that the engagement statuses determined in operation 402 indicate one or more under-engaged integration functionality metrics, the group-based communication server 106 proceeds to determine an integration policy for the one or more under-engaged integration functionality metrics and perform the integration policy in accordance with the determined integration policy. Moreover, in response to determining in operation 403 that the engagement statuses determined in operation 402 do not indicate any under-engaged integration functionality metrics, the group-based communication server 106 proceeds to operation 406 where the group-based communication server 106 determines to not perform dynamic user integration.

The integration policy determined in operation 404 is configured to render one or more integration notifications corresponding to the one or more under-engaged integration functionality metrics to the group-based user profile. The integration policy may define, for each integration notification of the one or more integration notifications corresponding to the one or more under-engaged integration functionality metrics, at least one of a presentation manner and an invocation manner. For example, given a detection of an under-engaged integration functionality metric associated with posting messages to group-based communication channels with respect to a particular group-based user profile, the integration policy for the particular group-based user profile may be configured to render one or more of an integration notification on a home page interface of a group-based communication system presented to the particular group-based user profile that encourages the particular group-based user profile to post a message to a group-based communication channel, an integration notification presented as a push notification on a computing device of the particular group-based user profile that encourages the particular group-based user profile to post a message to a group-based communication channel, an integration notification upon detecting a particular pattern of user activity (e.g., detecting an idle screen for a threshold period of time, browsing a particular group-based communication channel, etc.) by the particular group-based user profile that encourages the particular group-based user profile to post a message to a group-based communication channel, etc.

In some embodiments, at least one of timing, rendering technique, and contents of an integration notification are determined based on at least one inferred behavioral feature and/or at least one inferred demographic feature of the corresponding group-based user profile. For example, in some embodiments, the group-based communication server 106 may determine based on at least one inferred behavioral feature and/or at least one inferred demographic feature of the corresponding group-based user profile that push notifications are more effective in attracting attention of the corresponding end-user relative to intra-application notifications. The group-based communication server may then utilize such conclusions to determine a rendering technique of one or more integration notifications. In some embodiments, the group-based communication server 106 may (e.g., in accordance with at least some of the techniques described in relation to step 601 of process 600 depicted in FIG. 6) determine related group-based user profiles associated with the particular group-based user profile. The group-based communication server 106 may subsequently determine, based on the usage data of the determined related group-based user profiles, at least one of timing parameters, rendering technique parameters, and content parameters of one or more integration notifications. For example, the group-based communication server 106 may determine based on the usage data of the determined related group-based user profiles, that end-users associated with the related group-based user profiles are more likely to pay attention to notifications at night and/or notifications having particular color. The group-based communication server may then utilize such conclusions to determine timing and/or contents of one or more integration notifications.

In some embodiments, the one or more integration notifications include one or more indexed integration notifications configured to be rendered as part of a dynamic user integration portal. An operational example of a dynamic user integration portal 800 is presented in FIG. 8. As depicted in FIG. 8, the dynamic user integration portal 800 identifies various integration functionality metrics 801-803 and their corresponding engagement statuses 811-813. For example, the integration functionality metric 801 relates to a channel joining functionality and is associated with an engagement status 811 that indicates lack of completed engagement of the group-based user interface with the channel joining functionality. Furthermore, the integration functionality metric 802 relates to a notification configuration functionality and is associated with an engagement status 812 that indicates lack of completed engagement of the group-based user interface with the notification configuration functionality. Moreover, the integration functionality metric 803 relates to an interface joining functionality and is associated with an engagement status 813 that indicates completed engagement of the group-based user interface with the interface joining functionality.

In some embodiments, at least a portion of the indexed integration notifications may correspond to one or more of particular under-engaged integration functionality metrics deemed to be most critical to performing dynamic user integration, particular under-engaged integration functionality metrics whose respective engagement statuses indicates maximal levels of insufficient engagement, etc. In some embodiments, the primary integration portal is transmitted using a prioritized resource allocation status, e.g., to ensure that dynamic user integration of group-based user profiles is prioritized over various other operational goals of the group-based communication system 105 and avoid an integration bottleneck on the operational efficiency of the group-based communication system 105. In some embodiments, rendering a particular integration notification of the one or more integration notifications comprises rendering the particular integration notification in response to detecting a triggering user interaction associated with the corresponding under-engaged integration functionality metric associated for the particular integration notification.

In some embodiments, the group-based communication server 106 is configured to detect an integrative user interaction configured to engage with a particular under-engaged integration functionality metric of the one or more under-engaged functionality metrics, update the engagement status for the particular under-engaged functionality metric based on the integrative user interaction, and update the integration policy based on the updated engagement status for the particular under-engaged functionality metric. For example, based on monitoring usage data associated with a particular group-based user profile, the group-based communication server 106 may detect that the particular group-based user profile has engaged with a particular functionality associated with an under-engaged integration functionality metric in a manner that satisfies predefined engagement status criteria for an engagement status of the under-engaged integration functionality metric. In response, the group-based communication server 106 may update the engagement status of the under-engaged integration functionality metric to indicate that the engagement status for the under-engaged integration functionality metric satisfies the predefined engagement status criteria for the engagement status and thus that the referenced integration functionality metric is no longer deemed an under-engaged integration functionality metric.

In some embodiments, the integration notifications include one or more connection recommendations, wherein each connection recommendations of the one or more connection recommendations is associated with a related group-based user profile of one or more related group-based user profiles associated with the primary group-based user profile. In some embodiments, at least one related group-based user profiles may be calculated using at least one of the techniques described above in relation to step 601 of process 600 depicted in FIG. 6. In some embodiments, the related group-based user profiles associated with a particular group-based user profile include at least one of an inviting group-based user profile who has invited the particular group-based user profile to the group-based communication system 105 and one or more most-recently-joined group-based user profiles who have recently joined the group-based communication system 101 and are associated with at least one shared group-based communication interface that is also associated with the particular group-based user profile. For example, in the exemplary connection recommendation user interface 900 of FIG. 9, the connection recommendations include an inviting member connection recommendation 901 associated with an inviting group-based user profile (i.e., User 2) as well as five most-recently-joined member connection recommendations 902-905 each associated with a most-recently-joined group-based user profile (i.e., Users 3-6) who has recently joined the group-based communication system 101 and is associated with at least one shared group-based communication interface that is also associated with the particular group-based user profile. In some embodiments, the dynamic user integration portal includes an integration guidance user interface, such as the integration guidance interface 1000 of FIG. 10.

Additional Example Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs (i.e., one or more modules of computer program instructions) encoded on computer-readable storage medium for execution by, or to control the operation of, information/data processing apparatus. Alternatively, or in addition, the program instructions can be encoded on an artificially-generated propagated command (e.g., a machine-generated electrical, optical, or electromagnetic command) which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated command, a computer-readable storage medium can be a source or destination of computer program instructions encoded in an artificially-generated propagated command. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (Application Specific Integrated Circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data (e.g., magnetic, magneto-optical disks, or optical disks). However, a computer need not have such devices. Devices suitable for storing computer program instructions and information/data include all forms of non-volatile memory, media and memory devices, including by way of example semiconductor memory devices (e.g., EPROM, EEPROM, and flash memory devices; magnetic disks, such as internal hard disks or removable disks; magneto-optical disks; and CD-ROM and DVD-ROM disks). The processor and the memory can be supplemented by, or incorporated in, special purpose logic circuitry.

To provide for interaction with a user, embodiments of the subject matter described herein can be implemented on a computer having a display device (e.g., a CRT (cathode ray tube) or LCD (liquid crystal display) monitor) for displaying information/data to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input). In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component (e.g., as an information/data server), or that includes a middleware component (e.g., an application server), or that includes a front-end component (e.g., a client device having a graphical user interface or a web browser through which a user can interact with an implementation of the subject matter described herein), or any combination of one or more such back-end, middleware, or front-end components. The components of the system can be interconnected by any form or medium of digital information/data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for performing dynamic user integration in a group-based communication system, the apparatus comprising at least one processor and at least one memory including a computer program code, the at least one memory and the computer program code configured to, with the at least one processor, cause the apparatus to:
   identify a user profile associated with a recently joined member of the group-based communication system that is determined based at least in part on a length of time since the recently joined member joined the group-based communication system;
   determine a user status associated with the user profile based at least in part on a determination that a frequency in which the recently joined member interacted with a virtual space of the group-based communication system is equal to or less than a predefined threshold;
   determine an extent to which available functionalities of the group-based communication system have been utilized in association with the user profile;
   based at least in part on the user profile being associated with the recently joined member of the group-based communication system, the frequency being equal to or less than the predefined threshold, and the extent to which the available functionalities have been utilized in association with the user profile, identify one or more actions that are associated with the user status and that are authorized to be performed in association with the user profile;
   identify a first action of the one or more actions that has a performed status and a second action of the one or more actions that has an unperformed status;
   based at least in part on an identification of the first action and the second action, generate a user interface indicating the performed status of the first action and a recommendation for the second action; and
   cause the user interface to be rendered on a display associated with the user profile.

2. The apparatus of claim 1, wherein the user interface comprises an indexed integration notification that is configured to be rendered as part of a dynamic user integration portal.

3. The apparatus of claim 2, wherein the dynamic user integration portal is transmitted using a prioritized resource allocation status.

4. The apparatus of claim 1, wherein the user interface is rendered in response to detecting a triggering user interaction.

5. The apparatus of claim 1, wherein the at least one memory and the computer program code are configured to, with the at least one processor, cause the apparatus to:
   determine a plurality of other user profiles associated with the user profile;
   map a level of engagement for each of the plurality of other user profiles with respect to a plurality of other actions onto a functionality space; and
   select, from the plurality of other actions and based at least in part on the functionality space, the second action.

6. The apparatus of claim 1, wherein the second action comprises connecting with another user profile that is related to the user profile.

7. The apparatus of claim 1, wherein the user profile associated with the recently joined member of the group-based communication system comprises one of a group of most-recently-joined user profiles.

8. A computer-implemented method for performing dynamic user integration in a group-based communication system, the computer-implemented method comprising:
   identifying a user profile associated with a recently joined member of the group-based communication system that is determined based at least in part on a length of time since the recently joined member joined the group-based communication system;
   determining a user status associated with the user profile based at least in part on a determination that a frequency in which the recently joined member interacted with a virtual space of the group-based communication system is equal to or less than a predefined threshold;
   determining an extent to which available functionalities of the group-based communication system have been utilized in association with the user profile;
   based at least in part on the user profile being associated with the recently joined member of the group-based communication system, the frequency being equal to or less than the predefined threshold, and the extent to which the available functionalities have been utilized in association with the user profile, identifying one or more actions that are associated with the user status and that are authorized to be performed in association with the user profile;
   identify a first action of the one or more actions that has a performed status and a second action of the one or more actions that has an unperformed status;
   based at least in part on an identification of the first action and the second action, generating a user interface indicating the performed status of the first action and a recommendation for the second action; and
   causing the user interface to be rendered on a display associated with the user profile.

9. The computer-implemented method of claim 8, wherein the user interface comprises an indexed integration notification that is configured to be rendered as part of a dynamic user integration portal.

10. The computer-implemented method of claim 9, wherein the dynamic user integration portal is transmitted using a prioritized resource allocation status.

11. The computer-implemented method of claim 8, wherein the user interface is rendered in response to detecting a triggering user interaction.

12. The computer-implemented method of claim 8, further comprising:
   determining a plurality of other user profiles associated with the user profile;
   mapping a level of engagement for each of the plurality of other user profiles with respect to a plurality of other actions onto a functionality space; and
   selecting, from the plurality of other actions and based at least in part on the functionality space, the second action.

13. The computer-implemented method of claim 8, wherein the second action comprises connecting with another user profile that is related to the user profile.

14. The method of claim 8, wherein the user profile associated with the recently joined member of the group-based communication system comprises one of a group of most-recently-joined user profiles.

15. A non-transitory computer storage medium comprising instructions for performing dynamic user integration in a group-based communication system, the instructions being configured to cause one or more processors to at least perform operations configured to:
- identify a user profile associated with a recently joined member of the group-based communication system that is determined based at least in part on a length of time since the recently joined member joined the group-based communication system;
- determine a user status associated with the user profile based at least in part on a determination that a frequency in which the recently joined member interacted with a virtual space of the group-based communication system is equal to or less than a predefined threshold;
- determining an extent to which available functionalities of the group-based communication system have been utilized in association with the user profile;
- based at least in part on the user profile being associated with the recently joined member of the group-based communication system, the frequency being equal to or less than the predefined threshold, and the extent to which the available functionalities have been utilized in association with the user profile, identify one or more actions that are associated with the user status and that are authorized to be performed in association with the user profile;
- identify a first action of the one or more actions that has a performed status and a second action of the one or more actions that has an unperformed status;
- based at least in part on an identification of the first action and the second action, generate a user interface indicating the performed status of the first action and a recommendation for the second action; and
- cause the user interface to be rendered on a display associated with the user profile.

16. The non-transitory computer storage medium of claim 15, wherein the user interface comprises an indexed integration notification that is configured to be rendered as part of a dynamic user integration portal.

17. The non-transitory computer storage medium of claim 16, wherein the dynamic user integration portal is transmitted using a prioritized resource allocation status.

18. The non-transitory computer storage medium of claim 15, wherein the user interface is rendered in response to detecting a triggering user interaction.

19. The non-transitory computer storage medium of claim 15, wherein the instructions are further configured to cause one or more processors to at least perform operations configured to:
- determine a plurality of other user profiles associated with the user profile;
- map a level of engagement for each of the plurality of other user profiles with respect to a plurality of other actions onto a functionality space; and
- select, from the plurality of other actions and based at least in part on the functionality space, the second action.

20. The non-transitory computer storage medium of claim 15, wherein the user profile associated with the recently joined member of the group-based communication system comprises one of a group of most-recently-joined user profiles.

* * * * *